W. E. CROWTHER.
TWIST DRILL GRINDING JIG.
APPLICATION FILED NOV. 18, 1909.
978,851.
Patented Dec. 20, 1910.
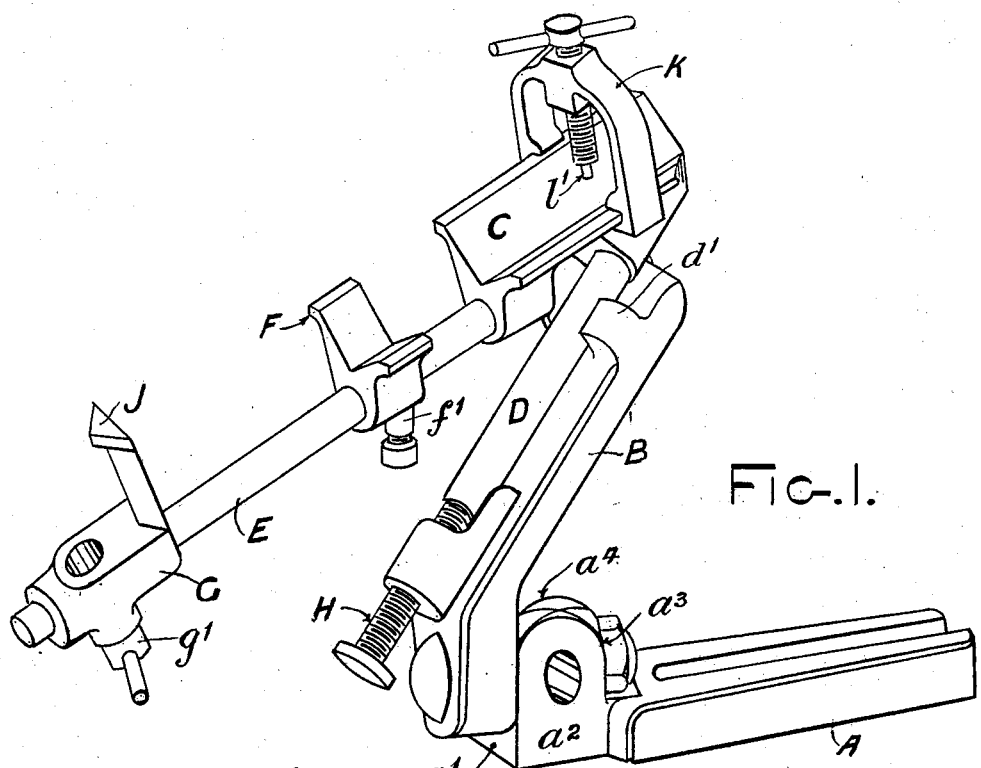
Fig. 1.
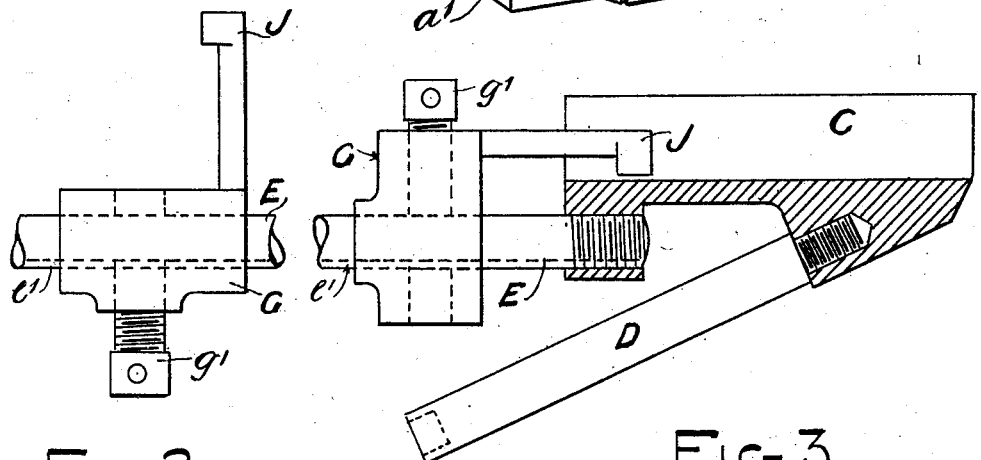
Fig. 2.
Fig. 3.
Witnesses
L. F. Brock.
M. K. Freeman.
Inventor
William Edward Crowther
by Chas. H. Riches
his atty.

UNITED STATES PATENT OFFICE.

WILLIAM EDWARD CROWTHER, OF NEW BRIGHTON, ENGLAND.

TWIST-DRILL-GRINDING JIG.

978,851.  Specification of Letters Patent.  Patented Dec. 20, 1910.

Application filed November 18, 1909. Serial No. 528,818.

*To all whom it may concern:*

Be it known that I, WILLIAM EDWARD CROWTHER, a subject of Great Britain, and resident of 1 Shiel road, New Brighton, in the county of Chester, England, engineer, have invented certain new and useful Improvements in Twist-Drill-Grinding Jigs, for which I have applied for Letters Patent in England, No. 24,904, dated November 19, 1908, and of which the following is a specification.

My invention relates to improvements in twist drill grinding jigs whereby such drills are more easily, expeditiously and accurately ground. I attain these objects by the mechanism illustrated on the accompanying drawings in which:—

Figure 1 is a general view of the jig complete. Fig. 2 is a side elevation of portion of the jig. Fig. 3 is a part elevation and part section showing the part shown in Fig. 2 in another position.

Similar letters refer to similar parts on the several views.

This jig for holding a drill while grinding against an emery wheel or grindstone, is formed of three main portions as shown by the general view Fig. 1 viz:—the base A, the bracket B and the trough C with the extensions and accessories. The base A is so made that it can be adjustably bolted down to the pedestal or bench of an emery wheel, or it may be otherwise used across a lathe bed when an emery wheel is run in a chuck.

To allow of adapting the position of the bracket B the base A has four fitting faces $a'$, $a^2$, $a^3$ and $a^4$ against any one of which the bracket B can be bolted. Additional adaptability is secured by the arrangement for swinging the bracket sidewise and clamping it at any angle against the face.

The trough C is of the usual V section and is fitted with a rotary spindle D and a grooved extension rod E carrying a sliding support F and adjustable back set G. These parts F and G are clamped by screws $f'$ and $g'$ taking into the groove $e'$ in the extension rod E. The upper end of the spindle D rests in V bearings $d'$ formed on the upper end of the bracket B and its lower end is socketed upon the upper end of the feed screw H so that the spindle and trough can be readily lifted from the bracket. The back set G is capable of taking an alternative position as shown in Fig. 3 rendering it suitable for use for very short and small drills by turning the part marked J over into the trough C.

To secure the drill steadily in its position in the trough C while grinding a clamp is used consisting of an arch bridge K which slides on the parallel edges of the trough C. A screw L passes centrally through the bridge K and bears upon the drill. The lower end of the screw is provided with a short axial pin or point $l'$. The right hand side of the trough C is cut away obliquely at the upper end to permit of the swing when grinding. When setting a drill for grinding the point should be advanced about two diameters beyond the end of the trough C; after grinding the first edge, the drill must be turned over in the trough an exact half turn. In case of drills of large diameter the clamping screw L is adjusted with its axial pin $l'$ against one helical edge of the drill while the surrounding flat surface bears upon the edge and secures it. After the first edge has been ground, the screw L is raised and the drill turned over until the corresponding helical edge can be secured in the same manner as the first.

Having now described my invention I declare that what I claim is:—

1. The combination in a twist drill grinding jig a base in the form of a clamping fork with a lug at one end, to any side of which is locked, at any desired angle, an inclined bracket provided with bearings, and an adjusting or feeding screw, supporting a spindle secured to the drill rest, said rest being fitted with a sliding bridge provided with a screw, the point of which bears upon the drill and also with a back set adapted to be used in two positions, substantially as described.

2. In a twist drill grinding jig, a base with a multilateral support at one end thereof, an inclined bracket, provided with bearings, secured to any selected side of the support, a feeding screw adjustable through one of the said bearings, a drill rest, a spindle secured to the drill rest and supported by the feeding screw, and the other of said bearings, a sliding bridge, and a back set, on the drill rest.

3. In a twist drill grinding jig, a base in the form of a clamping fork having at one end a multilateral support, an inclined bracket, provided with bearings, secured to any selected side of the support, a drill rest, a spindle secured to the drill rest and supported in one of said bearings, a feeding screw adjustable through the other of said bearings and engaging with said spindle, a sliding bridge mounted upon the drill rest provided with a set screw having a pin point and a back set for the drill rest to be used in two positions.

In witness whereof I have hereunto set my hand in the presence of two witnesses.

WILLIAM EDWARD CROWTHER.

Witnesses:
  H. WATSON,
  H. WILLIAMS.